F. J. HUPY.
FIREARM.
APPLICATION FILED JULY 15, 1912.
1,078,923.
Patented Nov. 18, 1913.
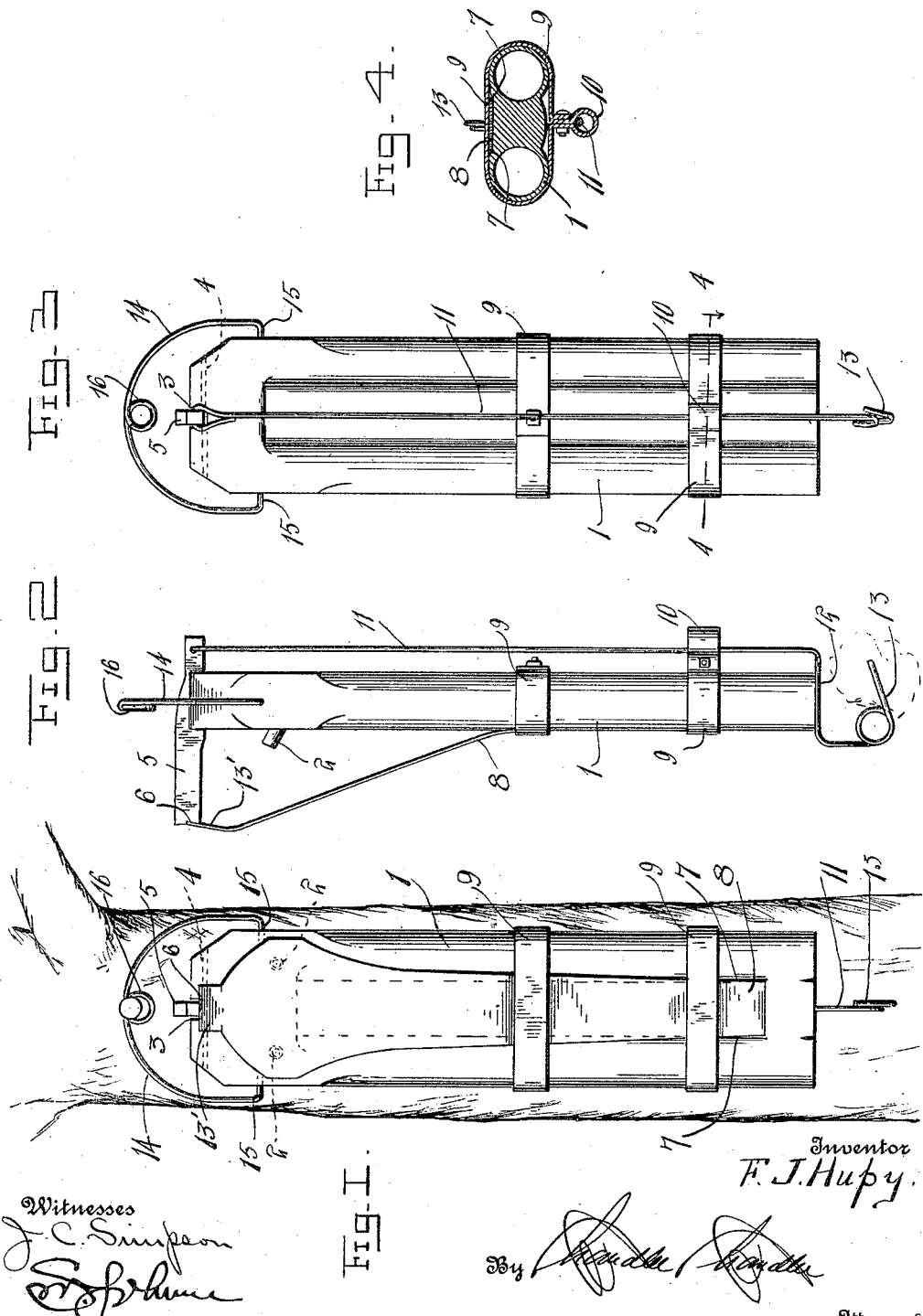

UNITED STATES PATENT OFFICE.

FRED J. HUPY, OF SPALDING, MICHIGAN.

FIREARM.

1,078,923.  Specification of Letters Patent.  Patented Nov. 18, 1913.

Application filed July 15, 1912. Serial No. 709,591.

*To all whom it may concern:*

Be it known that I, FRED J. HUPY, a citizen of the United States, residing at Spalding, in the county of Menominee, State of Michigan, have invented certain new and useful Improvements in Firearms; and I do hereby declare the following to be a full, clear, and exact description of the invention, such as will enable others skilled in the art to which it appertains to make and use the same.

This invention is directed to improvements in fire arms, and particularly to one adapted to be placed upon a fixed support and being so constructed that the same will be fired upon the attempt of an animal to remove a bait therefrom.

A still further object of the invention is to provide a fire arm of this character with improved means for exploding the concussion cap.

With these and other objects in view, this invention resides in the novel features of construction, formations, combinations and arrangements of parts to be hereinafter more fully described, claimed and illustrated in the accompanying drawing, in which:—

Figure 1 is a front view of the device showing the same suspended upon a tree trunk. Fig. 2 is a side elevation of the device. Fig. 3 is a rear elevation of the device. Fig. 4 is a sectional view on line 4—4 of Fig. 3.

The device consists of a double barrel member 1, the same being provided with a pair of cap nipples 2 which have communication with the barrels to ignite the charge which has been previously rammed therein. The upper edge of the member 1 is provided with a transversely disposed slot 3, which is bridged by a pin 4 and upon which is pivotally mounted the trigger 5, the outer end of which is provided with a notch 6, the purpose of which will appear later. The outer surface of the member 1 is formed with a longitudinal recess 7, and in which is secured the lower end of the strike plate 8, by bands 9 which embrace the barrel member, one of said bands having formed integral therewith a sleeve 10, and in which is slidably mounted the rod 11, the upper end of which is pivotally connected to the inner end of the trigger 5. The lower end of the rod 11 terminates in a horizontal portion 12, which in turn terminates in a hooked end 13, and upon which a suitable bait is secured.

The strike plate 8 is formed from resilient metal and is of sufficient strength so that when the trigger is operated the same will be permitted to contact with the concussion caps mounted upon the cap nipples to fire the same, and thus the charges contained in the barrels. The extreme upper end of the strike plate 8 terminates in a reduced portion 13' which has its upper edge bent inwardly slightly for engagement with the notch formed upon the outer end of the trigger 5.

A yoke 14 is provided, and has its arms formed with projections 15 which are engaged in the sides of the barrel member to support the same, said arms being provided with a loop 16, and through which a nail or other securing device is passed to support the device upon a tree at a suitable distance from the ground so that when an animal attempts to remove the bait from the hook, the trigger 5 will be operated to permit the strike plate to contact with the caps and thus explode the charges.

What is claimed is:—

In a fire arm of the class described consisting of a barrel member, the outer surface of which is provided with a recess, a strike plate having its lower end mounted in the recess, bands encircling the barrel member for holding said plate in the recess, one of said bands being provided with a sleeve, a slot formed in the upper end of the member, a trigger pivotally mounted in the slot, the outer end of which is provided with a notch for engaging the upper end of the strike plate, a rod extending longitudinally of the barrel member and slidable in the sleeve, said rod having its upper end pivotally connected to the trigger, a hook formed upon the lower end of the rod for securing a bait thereto, said rod being operable to oscillate the trigger to release the strike plate to ignite the charges contained in the barrel member.

In testimony whereof, I affix my signature, in presence of two witnesses.

FRED J. HUPY.

Witnesses:
 MILTON KELL,
 AMANDA EHLERS.

---

Copies of this patent may be obtained for five cents each, by addressing the "Commissioner of Patents, Washington, D. C."